(12) United States Patent
Chang

(10) Patent No.: US 12,259,529 B2
(45) Date of Patent: Mar. 25, 2025

(54) LENS ASSEMBLY

(71) Applicants: Sintai Optical (Shenzhen) Co., Ltd., ShenZhen (CN); Asia Optical Co., Inc., Taichung (TW)

(72) Inventor: An-Kai Chang, Taichung (TW)

(73) Assignees: SINTAI OPTICAL (SHENZHEN) CO., LTD., Shenzhen (CN); ASI OPTICAL CO., INC., Taichung (TW)

( * ) Notice: Subject to any disclaimer, the term of this patent is extended or adjusted under 35 U.S.C. 154(b) by 568 days.

(21) Appl. No.: 17/555,966

(22) Filed: Dec. 20, 2021

(65) Prior Publication Data

US 2022/0229274 A1 Jul. 21, 2022

(30) Foreign Application Priority Data

Jan. 20, 2021 (TW) ................... 110102123

(51) Int. Cl.
*G02B 9/64* (2006.01)
*G02B 13/00* (2006.01)
*G02B 27/00* (2006.01)

(52) U.S. Cl.
CPC ........... *G02B 13/0045* (2013.01); *G02B 9/64* (2013.01); *G02B 27/0025* (2013.01)

(58) Field of Classification Search
CPC .. G02B 13/0045; G02B 9/64; G02B 27/0025; G02B 13/005; G02B 13/00; G02B 27/00
USPC ..................... 359/681, 218.1, 750
See application file for complete search history.

(56) References Cited

U.S. PATENT DOCUMENTS

| | | | |
|---|---|---|---|
| 10,983,315 B2 | 4/2021 | Maetaki | |
| 2017/0212334 A1* | 7/2017 | Imaoka | G02B 13/08 |
| 2017/0248775 A1 | 8/2017 | Shih | |
| 2017/0307858 A1* | 10/2017 | Chen | G02B 13/18 |
| 2018/0081156 A1* | 3/2018 | Suzuki | H04N 23/69 |
| 2020/0033562 A1* | 1/2020 | Tomioka | G02B 7/04 |
| 2020/0073092 A1 | 3/2020 | Chen | |
| 2021/0072498 A1* | 3/2021 | Wei | G02B 9/64 |
| 2021/0132346 A1* | 5/2021 | Kitada | H04N 23/55 |
| 2021/0173180 A1* | 6/2021 | Sun | G02B 13/18 |

(Continued)

FOREIGN PATENT DOCUMENTS

| | | |
|---|---|---|
| CN | 107045183 A | 8/2017 |
| CN | 107132643 A | 9/2017 |

(Continued)

*Primary Examiner* — Balram T Parbadia
*Assistant Examiner* — John Curtis Sipes
(74) *Attorney, Agent, or Firm* — McClure, Qualey & Rodack, LLP

(57) ABSTRACT

A lens assembly comprises a first lens, a second lens, a third lens, a fourth lens, a sixth lens, a seventh lens and an eighth lens which are arranged sequentially from an object side to an image side along an optical axis. The first lens is a meniscus lens with negative refractive power and comprises a convex surface facing an object side and a concave surface facing an image side. The second lens is with negative refractive power. The third lens is with refractive power. The fourth lens is with positive refractive power. The fifth lens is with positive refractive power and comprises a convex surface facing the image side. The sixth lens is with refractive power. The seventh lens is with positive refractive power. The eighth lens is with refractive negative power and comprises a concave surface facing the object side.

18 Claims, 12 Drawing Sheets

(56) References Cited

U.S. PATENT DOCUMENTS

| | | | |
|---|---|---|---|
| 2021/0396955 A1* | 12/2021 | Okano | G02B 13/0045 |
| 2021/0396959 A1* | 12/2021 | Tseng | G02B 9/64 |
| 2022/0050271 A1* | 2/2022 | Li | G02B 13/08 |

FOREIGN PATENT DOCUMENTS

| | | |
|---|---|---|
| CN | 110161656 A | 8/2019 |
| CN | 111190267 A | 5/2020 |
| CN | 111399171 A | 7/2020 |
| JP | 2014178522 A | 9/2014 |
| JP | 2019152683 A | 9/2019 |
| TW | 201214006 A | 4/2012 |

* cited by examiner

LENS ASSEMBLY

BACKGROUND OF THE INVENTION

Field of the Invention

The invention relates to a lens assembly.

Description of the Related Art

The current development trend of a lens assembly is toward miniaturization and high resolution. Additionally, the lens assembly is developed to have resistance to severe environment temperature variation in accordance with different application requirements. However, the known lens assembly can't satisfy such requirements. Therefore, the lens assembly needs a new structure to meet the requirements of miniaturization, high resolution, and resistance to severe environment temperature variation at the same time.

BRIEF SUMMARY OF THE INVENTION

The invention provides a lens assembly to solve the above problems. The lens assembly of the invention is provided with characteristics of a shortened total lens length, a smaller F-number, a high resolution, a resistance to severe environment temperature variation, and still has a good optical performance.

The assembly in accordance with an exemplary embodiment of the invention includes a first lens, a second lens, a third lens, a fourth lens, a fifth lens, a sixth lens, a seventh lens, and an eighth lens. The first lens is a meniscus lens with negative refractive power and includes a convex surface facing an objective side as well as a concave surface facing an image side. The second lens is with negative refractive power. The third lens is with refractive power. The fourth lens is with positive refractive power. The fifth lens is with positive refractive power and includes a convex surface facing the image side. The sixth lens is with refractive power. The seventh lens is with positive refractive power. The eighth lens is with negative refractive power and includes a concave surface facing the objective side. The first lens, the second lens, the third lens, the fourth lens, the fifth lens, the sixth lens, the seventh lens, and the eighth lens are arranged in order from the object side to the image side along an optical axis.

In another exemplary embodiment, the third lens is with positive refractive power. The fourth lens includes a convex surface facing the image side. The sixth lens is with positive refractive power. The seventh lens includes a convex surface facing the objective side.

In another exemplary embodiment, the fourth lens is a meniscus lens and further includes a concave surface facing the image side. The fifth lens is a meniscus lens and further includes a concave surface facing the objective side. The seventh lens is a biconvex lens and further includes a convex surface facing the image side.

In another exemplary embodiment, the second lens is a meniscus lens and includes a convex surface facing the objective side as well as a concave surface facing the image side. The third lens is a biconvex lens and includes a convex surface facing the objective side as well as another convex surface facing the image side. The sixth lens is a meniscus lens and includes a concave surface facing the objective side as well as a convex surface facing the image side. The eighth lens is a meniscus lens and further includes a convex surface facing the image side.

In another exemplary embodiment, the second lens is a meniscus lens and includes a convex surface facing the objective side as well as a concave surface facing the image side. The third lens is a meniscus lens and includes a convex surface facing the objective side as well as a concave surface facing the image side. The sixth lens is a biconvex lens and includes a convex surface facing the objective side as well as another convex surface facing the image side. The eighth lens is a biconcave lens and further includes a concave surface facing the image side.

In another exemplary embodiment, the fourth lens is a biconvex lens and further includes another convex surface facing the objective side. The fifth lens is a biconvex lens and further includes another convex surface facing the objective side. The seventh lens is a meniscus lens and further includes a concave surface facing the image side. The eighth lens is a biconcave lens and further includes another concave surface facing the image side.

In another exemplary embodiment, the second lens is a meniscus lens and includes a concave surface facing the objective side as well as a convex surface facing the image side. The third lens is a meniscus lens and includes a concave surface facing the objective side as well as a convex surface facing the image side. The sixth lens is a meniscus lens and includes a convex surface facing the objective side as well as a concave surface facing the image side.

The lens assembly of the invention can further include a stop disposed between the fourth lens and the fifth lens.

In yet another exemplary embodiment, the lens assembly satisfies at least one of the following conditions: $0.05<GAP5678/T5678<0.25$, $-2.0<f1/f<-1.7$, wherein GAP5678 is a sum of an air interval from the fifth lens to the eighth lens along the optical axis, T5678 is a sum of a lens thickness of the fifth lens to the eighth lens along the optical axis, f is an effective focal length of the lens assembly, and $f_1$ is an effective focal length of the first lens.

In yet another exemplary embodiment, the lens assembly satisfies at least one of the following conditions: $1.0<D1/D7<1.1$, $0.02<GAP5678/TTL<0.06$, wherein D1 is a larger one of an optical effective diameter of the objective surface and the image surface of the first lens, D7 is a larger one of an optical effective diameter of the objective surface and the image surface of the seventh lens, GAP5678 is a sum of an air interval from the fifth lens to the eighth lens along the optical axis, and TTL is an interval from the objective surface of the first lens to the image plane along the optical axis.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

The invention provides a lens assembly including a first lens, a second lens, a third lens, a fourth lens, a fifth lens, a sixth lens, a seventh lens, and an eighth lens. The first lens is a meniscus with negative refractive power and includes a convex surface facing an object side as well as a concave surface facing an image side. The second lens is with negative refractive power. The third lens is with refractive power. The fourth lens is with positive refractive power. The fifth lens is with positive refractive power and includes a convex surface facing the image side. The sixth lens is with refractive power. The seventh lens is with positive refractive power. The eighth lens is with negative refractive power and includes a concave surface facing the objective side. The first lens, the second lens, the third lens, the fourth lens, the fifth lens, the sixth lens, the seventh lens, and the eighth lens are arranged in order from the object side to then image side along an optical axis.

Referring to Table 1, Table 3, and Table 5, wherein Table 1, Table 3, and Table 5 show the parameters of the lenses in accordance with the first embodiment to the third embodiment of the invention respectively.

Figure 1:
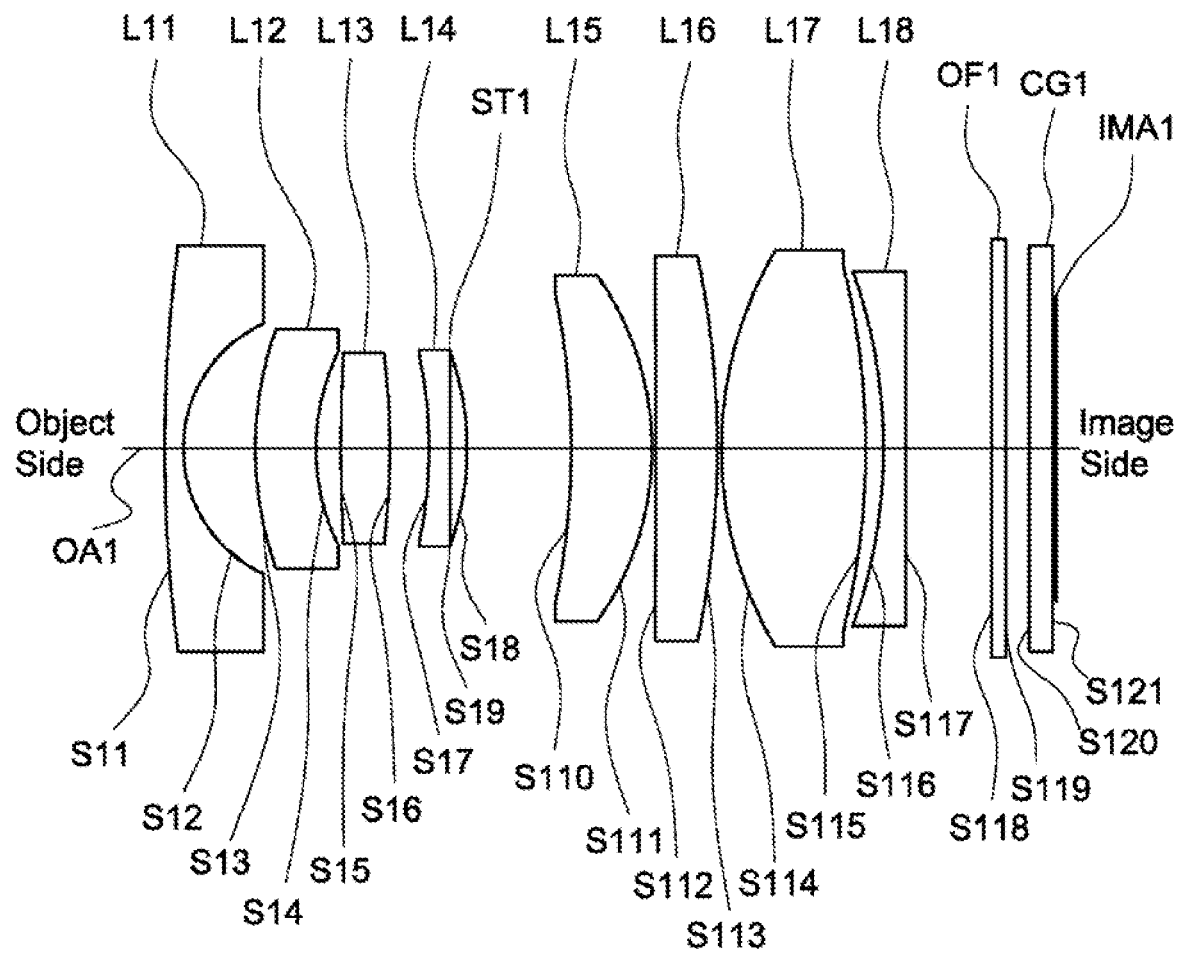
FIG. 1 is a lens layout diagram of a lens assembly in accordance with a first embodiment of the invention.
Figure 3:
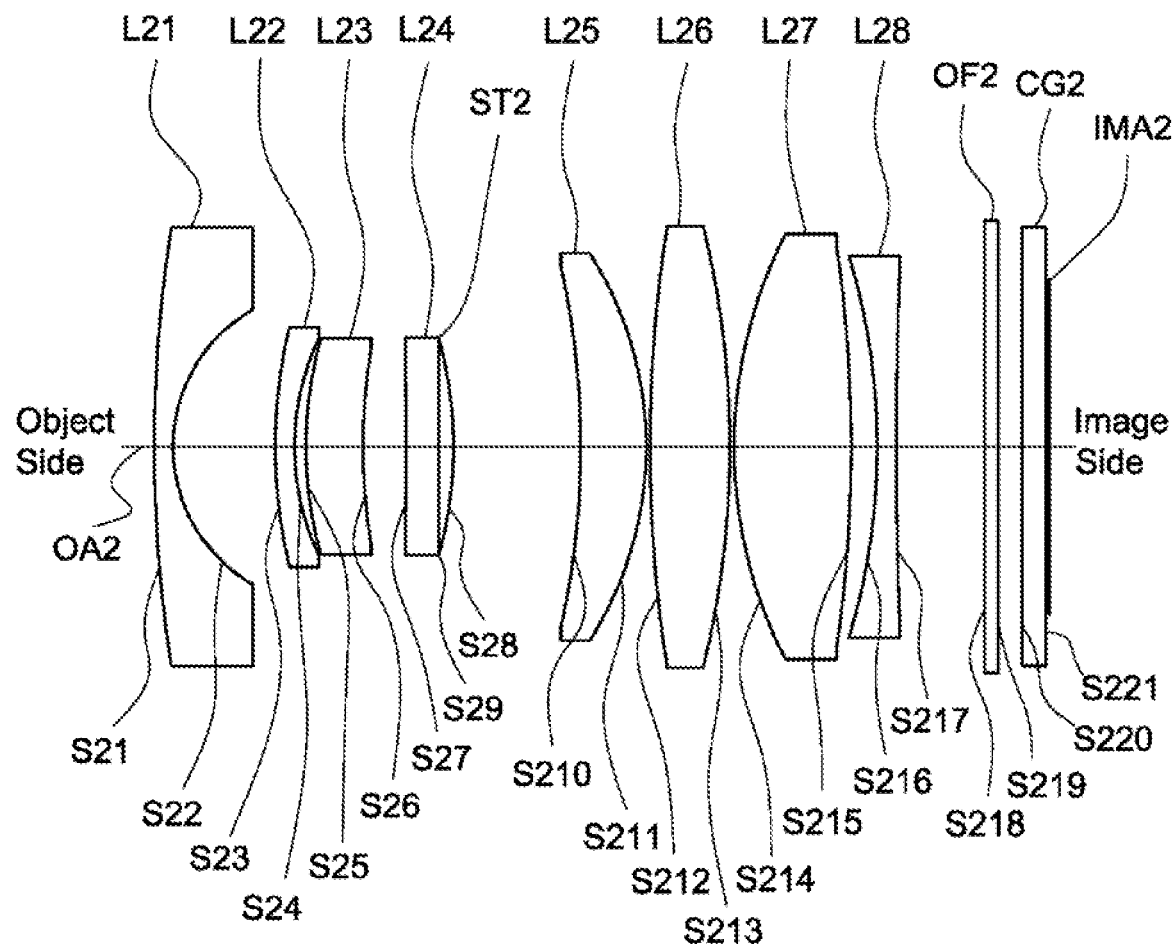
FIG. 3 is a lens layout diagram of a lens assembly in accordance with a second embodiment of the invention.
Figure 5:
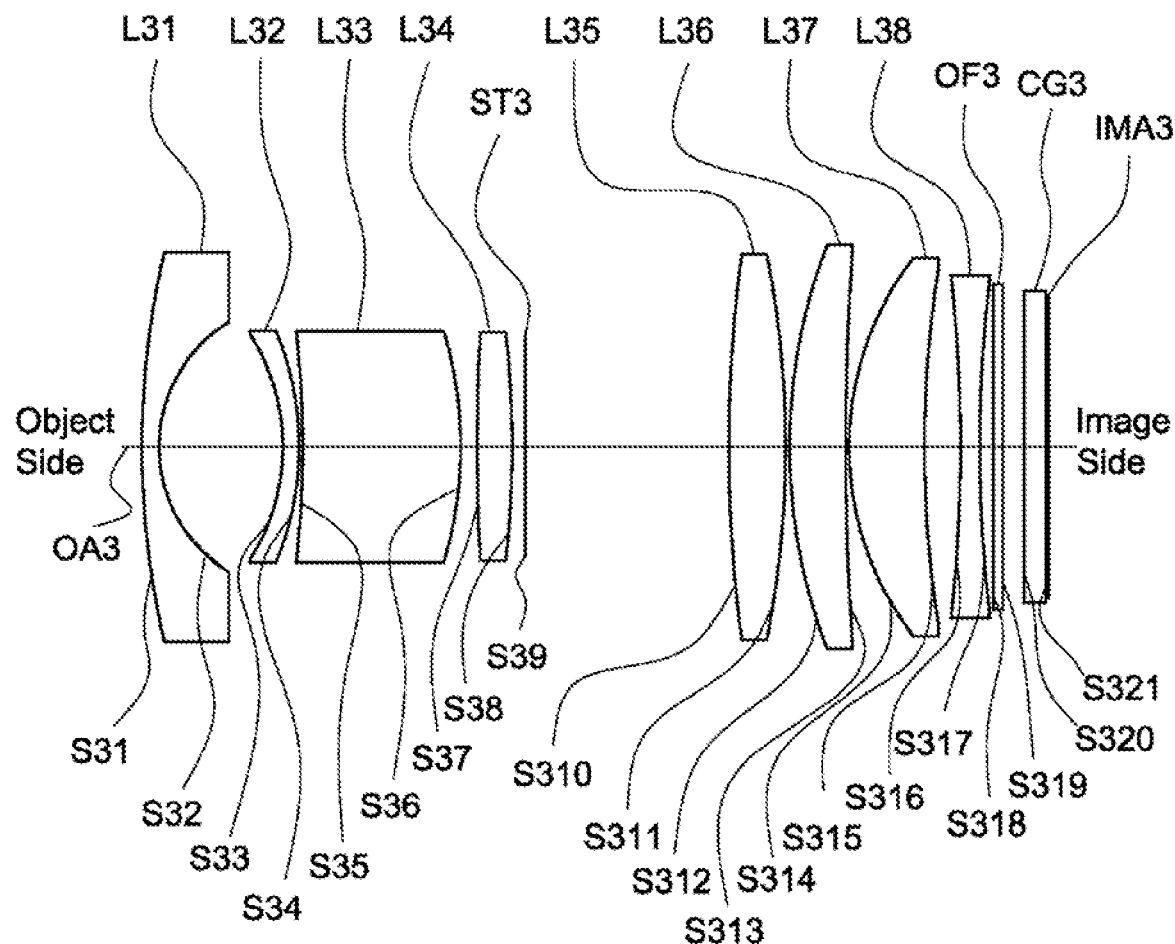
FIG. 5 is a lens layout diagram of a lens assembly in accordance with a third embodiment of the invention.

FIG. 1, FIG. 3, and FIG. 5 are the lens layout diagram of the lens assembly in accordance with the first embodiment, the second embodiment, and the third embodiment of the invention respectively. The first lenses L11, L21, L31 are meniscus lenses with negative refractive power and are made of glass. The objective surfaces thereof S11, S21, S31 are convex. The image surfaces thereof S12, S22, S32 are concave. Both of the objective surfaces S11, S21, S31 and the image surfaces S12, S22, S32 thereof are spherical surfaces.

The second lenses L12, L22, L32 are meniscus lenses with negative refractive power and are made of glass. Both the objective surfaces S13, S23, S33 and the image surfaces S14, S24, S34 thereof are spherical surfaces.

The third lenses L13, L23, L33 are with positive refractive power and are made of glass. Both the objective surfaces S15, S25, S35 and the image surfaces S16, S26, S36 thereof are spherical surfaces.

The fourth lenses L14, L24, L34 are with positive refractive power and are made of glass. The image surfaces thereof S18, S28, S38 are convex. Both the objective surfaces S17, S27, S37 and the image surfaces S18, S28, S38 thereof are spherical surfaces.

The fifth lenses L15, L25, L35 are with positive refractive power, and are made of glass. The image surfaces thereof S111, S211, S311 are convex. Both the objective surfaces S110, S210, S310 and image surfaces S111, S211, S311 thereof are spherical surfaces.

The sixth lenses L16, L26, L36 are with positive refractive power and are made of glass. Both the objective surfaces S112, S212, S312 and the image surfaces thereof S113, S213, S313 are spherical surfaces.

The seventh lenses L17, L27, L37 are with positive refractive power and are made of glass. The objective surface thereof S114, S214, S314 are convex. Both the objective surfaces S114, S214, S314 and the image surfaces thereof S115, S215, S315 are spherical surfaces.

The eighth lenses L18, L28, L38 are with negative refractive power and are made of glass. The objective surfaces thereof S116, S216, S316 are concave. Both the objective surfaces S116, S216, S316 and the image surfaces S117, S217, S317 thereof are spherical surfaces.

In addition, the lens assemblies 1, 2, 3 satisfy at least one of the following conditions:

$$0.05 < GAP_{5678}/T_{5678} < 0.25 \tag{1}$$

$$-2.0 < f_1/f < -1.7 \tag{2}$$

$$1.0 < D_1/D_7 < 1.1 \tag{3}$$

$$0.02 < GAP_{5678}/TTL < 0.06 \tag{4}$$

For the first embodiment to the third embodiment, GAP5678 is a sum of an air interval from the fifth lenses L15, L25, L35 to the eighth lenses L18, L28, L38 along the optical axes OA1, OA2, OA3. T5678 is a sum of a lens thickness of the fifth lenses L15, L25, L35 to the eighth lenses L18, L28, L38 along the optical axes OA1, OA2, OA3. $f_1$ is an effective focal length of the first lenses L11, L21, L31. f is an effective focal length of the lens assembly 1, 2, 3. D1 is a larger one of optical effective diameter of objective surfaces S11, S21, S31 and the image surfaces S12, S22, S32 of the first lenses L11, L21, L31. D7 is a larger one of optical effective diameter of the objective surfaces S114, S214, S314 and the image surfaces S115, S215, S315 of the seventh lenses L17, L27, L37. TTL is an interval from the objective surfaces S11, S21, S31 of the first lens to the image plane IMA1, IMA2, IMA3 along the optical axes OA1, OA2, OA3 respectively. With the lens assemblies 1, 2, 3 satisfying at least one of the above conditions (1)-(4), total lens length can be effectively shorten, the resolution can be effectively increased, the environmental temperature change can be effectively resisted, the aberration can be effectively corrected.

The total lens length of the lens assemblies can be effectively shorten when the equation (1) 0.05<GAP5678/T5678<0.25 is satisfied. The field of view of the lens assemblies can be effectively increased when the equation (2) −2.0<f1/f<−1.7 is satisfied. The diameter can be effectively reduced when the equation (3) 1.0<D1/D7<1.1 is satisfied. The total lens length of the lens assemblies can be effectively shorten when the equation (4) 0.02<GAP5678/TTL<0.06 is satisfied. By the design that all of the lenses of the lens assemblies are made of glass with spherical surfaces, the environmental temperature change can be effectively resisted. It makes the lens assemblies 1, 2, 3 can still have a good optical properties under high or low temperature. It makes the cost of the production thereof can be effectively reduced. It makes the lens assemblies 1, 2, 3 not easy to be damaged and can still have good optical properties even after long term use.

A detailed description of the lens assembly in accordance with the first embodiment of the invention is as follows. Referring to FIG. 1, the lens assembly 1 includes a first lens L11, a second lens L12, a third lens L13, a fourth lens L14, a stop ST1, a fifth lens L15, a sixth lens L16, a seventh lens L17, an eighth lens L18, an optical filter OF1, and a cover glass CG1, all of which are arranged in order from an object side to an image side along an optical axis OA1. In operation, an image of light rays from the object side is formed at an image plane IMA1. According to the foregoing paragraphs, wherein:

The second lens L12 is a meniscus lens, the objective surface S13 thereof is convex, and the image surface S14 thereof is concave. The third lens L13 is a biconvex lens, the objective surface S15 thereof is convex, and the image surface S16 thereof is also convex. The fourth lens L14 is a meniscus lens, and the objective surface S17 thereof is concave. The fifth lens L15 is a meniscus lens, and the objective surface S110 thereof is concave. The sixth lens L16 is a meniscus lens, the objective surface S112 thereof is concave, and the image surface S113 thereof is convex. The seventh lens L17 is a biconvex lens, and the image surface S115 thereof is convex. The eighth lens L18 is a meniscus lens, and the image surface S117 thereof is convex.

Both the objective surface S118 and the image surface S119 of the optical filter OF1 are flat surfaces.

Both the objective surface S120 and the image surface S121 of the cover glass CG1 are flat surfaces.

With the above design of the lenses and the stop ST1 and at least any one of the conditions (1)-(4) satisfied, the lens assembly 1 can have an effective shorter total lens length, an effective increased resolution, an effective resisted environmental temperature change, and is capable of an effective corrected aberration.

Table 1 shows the optical specification of the lens assembly 1 in FIG. 1.

TABLE 1

Effective Focal Length = 2.959 mm F-number = 1.34
Total Lens Length = 19.004 mm Field Of View = 148 Degrees

| Surface Number | Radius of Curvature (mm) | Thickness (mm) | Nd | Vd | Effective Focal Length (mm) | Remark |
|---|---|---|---|---|---|---|
| S11 | 33.442 | 0.400 | 1.62 | 60.4 | −5.312 | The First Lens L11 |
| S12 | 2.948 | 1.529 | | | | |
| S13 | 7.609 | 1.297 | 1.65 | 55.9 | −24.391 | The Second Lens L12 |
| S14 | 4.778 | 0.527 | | | | |
| S15 | 44.310 | 1.042 | 2 | 25.4 | 12.587 | The Third Lens L13 |
| S16 | −16.704 | 0.831 | | | | |
| S17 | −9.684 | 0.818 | 1.9 | 37.4 | 16.517 | The Fourth s Len L14 |
| S18 | −6.046 | −0.369 | | | | |
| S19 | ∞ | 2.591 | | | | Stop ST1 |
| S110 | −16.253 | 1.726 | 1.76 | 52.3 | 13.213 | The Fifth Lens L15 |
| S111 | −6.398 | 0.100 | | | | |
| S112 | −199.235 | 1.297 | 1.88 | 40.8 | 25.407 | The sixth Lens L16 |
| S113 | −19.869 | 0.089 | | | | |
| S114 | 8.398 | 3.077 | 1.77 | 49.6 | 7.635 | The seventh Lens L17 |

TABLE 1-continued

Effective Focal Length = 2.959 mm F-number = 1.34
Total Lens Length = 19.004 mm Field Of View = 148 Degrees

| Surface Number | Radius of Curvature (mm) | Thickness (mm) | Nd | Vd | Effective Focal Length (mm) | Remark |
|---|---|---|---|---|---|---|
| S115 | −15.882 | 0.376 | | | | |
| S116 | −11.229 | 0.474 | 1.99 | 16.5 | −11.904 | The eighth Lens L18 |
| S117 | −2959.847 | 1.822 | | | | |
| S118 | ∞ | 0.300 | 1.52 | 64.2 | | optical filter OF1 |
| S119 | ∞ | 0.500 | | | | |
| S120 | ∞ | 0.500 | 1.52 | 64.2 | | cover glass CG1 |
| S121 | ∞ | 0.076 | | | | |

Table 2 shows the parameters and condition values for conditions (1)-(4) in accordance with the first embodiment of the invention. It can be seen from Table 2 that the lens assembly 1 of the first embodiment satisfies the conditions (1)-(4).

TABLE 2

| $GAP_{5678}$ | 0.565 mm | $T_{5678}$ | 6.573 mm | $D_1$ | 8.662 mm |
|---|---|---|---|---|---|
| $D_7$ | 8.440 mm | | | | |
| $GAP_{5678}/T_{5678}$ | 0.086 | $f_1/f$ | −1.795 | $D_1/D_7$ | 1.026 |
| $GAP_{5678}/TTL$ | 0.030 | | | | |

Figure 2A:
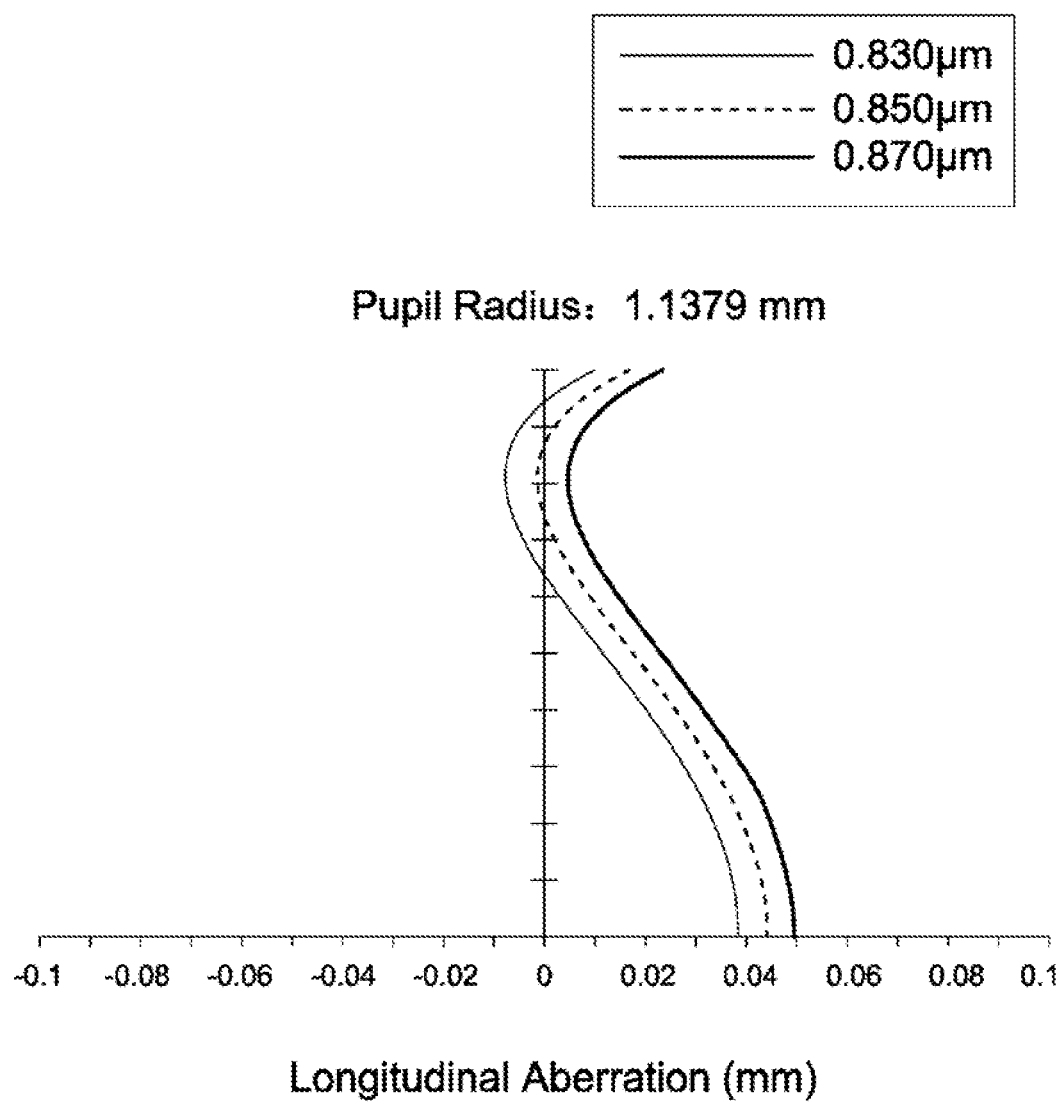
FIG. 2A is a longitudinal aberration diagram of the lens assembly in accordance with the first embodiment of the invention.
Figure 2B:
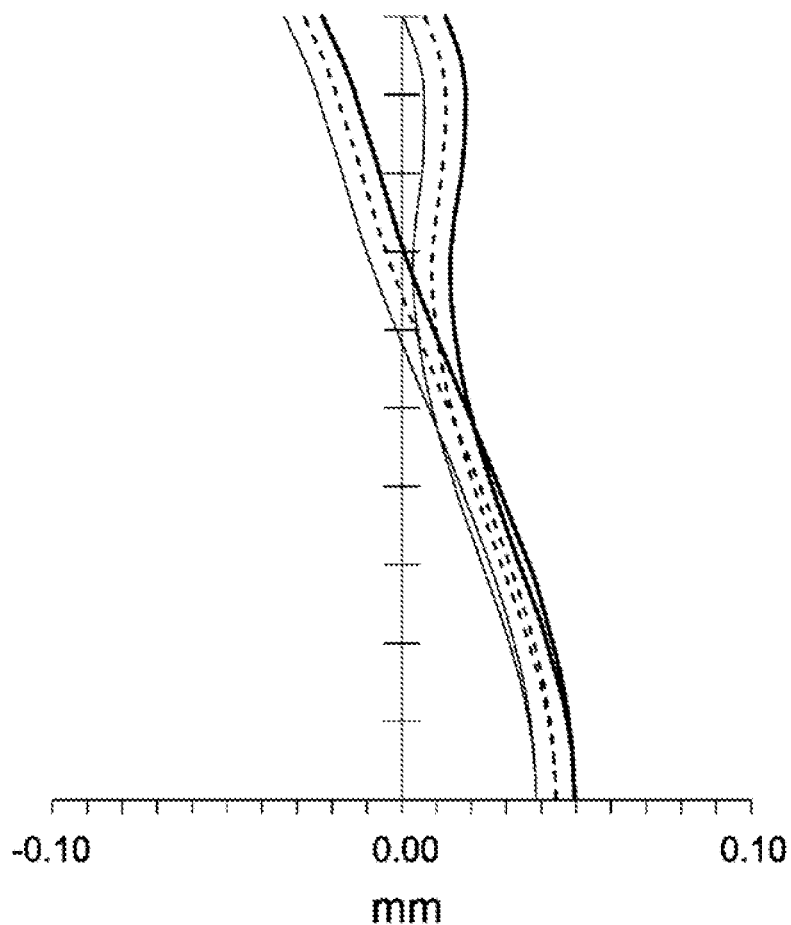
FIG. 2B is a field curvature diagram of the lens assembly in accordance with the first embodiment of the invention.
Figure 2C:
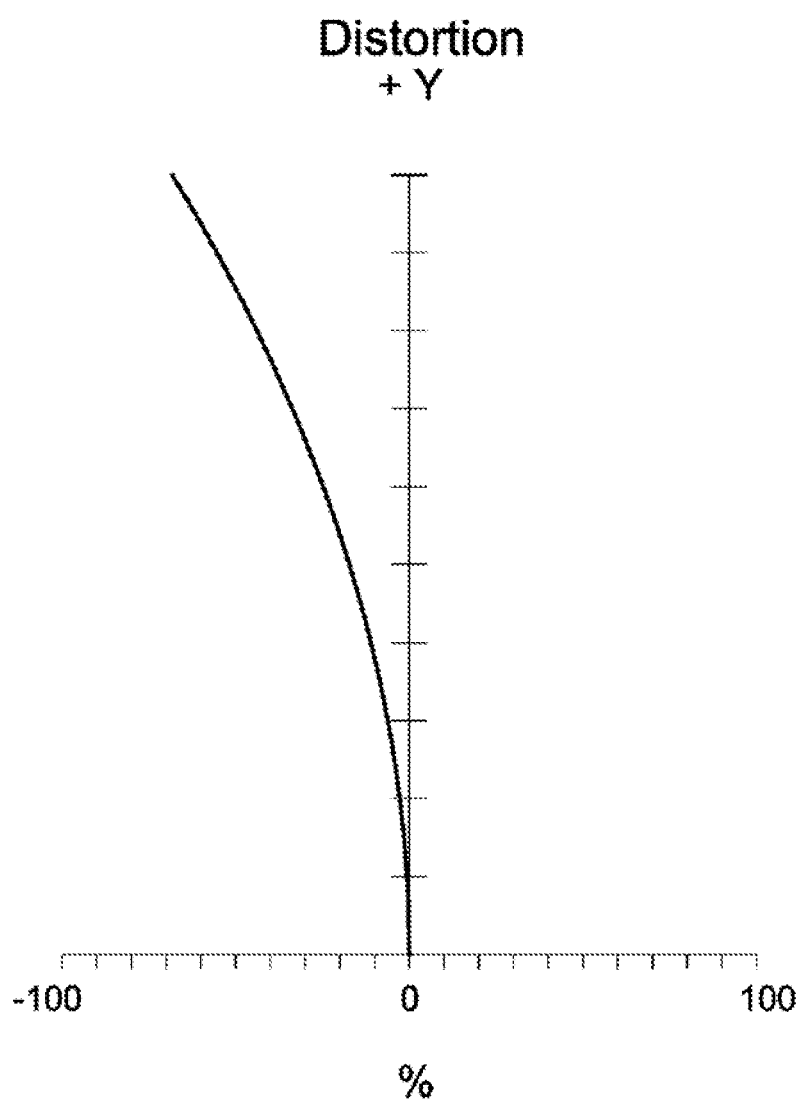
FIG. 2C is a distortion diagram of the lens assembly in accordance with the first embodiment of the invention.

Besides, by the above arrangements of the lenses and the stop ST1, the lens assembly 1 of the first embodiment can meet the requirements of optical performance. It can be seen from FIG. 2A that the longitudinal aberration in the lens assembly 1 of the first embodiment ranges from −0.01 mm to 0.05 mm. It can be seen from FIG. 2B that the field curvature of tangential direction and sagittal direction in the lens assembly 1 of the first embodiment ranges from −0.04 mm to 0.05 mm. It can be seen from FIG. 2C that the distortion in the lens assembly 1 of the first embodiment ranges from −70% to 0%.

It is obvious that the longitudinal aberration, the field curvature, and the distortion of the lens assembly 1 of the first embodiment can be corrected effectively. Therefore, the lens assembly 1 of the first embodiment is capable of good optical performance.

Referring to FIG. 3, the lens assembly 2 includes a first lens L21, a second lens L22, a third lens L23, a fourth lens L24, a stop ST1, a fifth lens L25, a sixth lens L26, a seventh lens L27, an eighth lens L28, an optical filter OF2, and a cover glass CG2, all of which are arranged in order from an object side to an image side along an optical axis OA2. In operation, an image of light rays from the object side is formed at an image plane IMA2. According to the foregoing paragraphs, wherein:

The second lens L22 is a meniscus lens, the objective surface S23 thereof is convex, and the image surface S24 thereof is concave. The third lens L23 is a meniscus lens, the objective surface S15 thereof is convex, and the image surface S16 thereof is concave. The fourth lens L24 is a meniscus lens, and the objective surface S27 thereof is concave. The fifth lens L25 is a meniscus lens, and the objective surface S210 thereof is concave. The sixth lens L26 is a biconvex lens, the objective surface S212 thereof is convex, and the image surface S213 thereof is convex. The seventh lens L27 is a biconvex lens, and the image surface S215 thereof is convex. The eighth lens L28 is a biconcave lens, and the image surface S217 thereof is concave.

Both the objective surface S218 and the image surface S219 of the optical filter OF2 are flat surfaces.

Both an objective surface S220 and an image surface S221 of the cover glass CG2 are flat surfaces.

With the above design of the lenses and the stop ST2 and at least any one of the conditions (1)-(4) satisfied, the lens assembly 2 can have an effective shorter total lens length, an effective increased resolution, an effective resisted environmental temperature change, and is capable of an effective corrected aberration.

Table 3 shows the optical specification of the lens assembly 2 in FIG. 3.

TABLE 3

Effective Focal Length = 2.953 mm F-number = 1.34
Total Lens Length = 18.995 mm Field Of View = 148 Degrees

| Surface Number | Radius of Curvature (mm) | Thickness (mm) | Nd | Vd | Effective Focal Length (mm) | Remark |
|---|---|---|---|---|---|---|
| S21 | 25.923 | 0.400 | 1.65 | 55.9 | −5.376 | The First Lens L21 |
| S22 | 3.017 | 2.171 | | | | |
| S23 | 9.524 | 0.411 | 1.68 | 55.6 | −14.747 | The Second Lens L22 |
| S24 | 4.751 | 0.241 | | | | |
| S25 | 7.402 | 1.221 | 1.99 | 16.5 | 19.858 | The Third Lens L23 |
| S26 | 11.312 | 0.901 | | | | |
| S27 | −116.270 | 1.009 | 1.83 | 42.7 | 9.88 | The Fourth Lens L24 |
| S28 | −7.571 | −0.310 | | | | |
| S29 | ∞ | 3.005 | | | | Stop ST2 |
| S210 | −15.504 | 1.397 | 1.66 | 57.4 | 17.078 | The Fifth Lens L25 |
| S211 | −6.686 | 0.093 | | | | |
| S212 | 27.362 | 1.673 | 1.88 | 40.9 | 12.48 | The sixth Lens L26 |
| S213 | −17.253 | 0.092 | | | | |
| S214 | 8.591 | 2.499 | 1.69 | 54.9 | 9.688 | The seventh Lens L27 |
| S215 | −24.697 | 0.550 | | | | |
| S216 | −12.036 | 0.400 | 1.99 | 16.5 | −11.34 | The eighth Lens L28 |
| S217 | 92.057 | 1.867 | | | | |
| S218 | ∞ | 0.300 | 1.52 | 64.2 | | optical filter OF2 |
| S219 | ∞ | 0.500 | | | | |
| S220 | ∞ | 0.500 | 1.52 | 64.2 | | cover glass CG2 |
| S221 | ∞ | 0.076 | | | | |

Table 4 shows the parameters and condition values for conditions (1)-(4) in accordance with the second embodiment of the invention. It can be seen from Table 4 that the lens assembly 2 of the second embodiment satisfies the conditions (1)-(4).

TABLE 4

| | | | | | |
|---|---|---|---|---|---|
| $GAP_{5678}$ | 0.735 mm | $T_{5678}$ | 5.969 mm | $D_1$ | 8.659 mm |
| $D_7$ | 8.408 mm | | | | |
| $GAP_{5678}/T_{5678}$ | 0.123 | $f_1/f$ | −1.820 | $D_1/D_7$ | 1.030 |
| $GAP_{5678}/TTL$ | 0.039 | | | | |

Figure 4A:
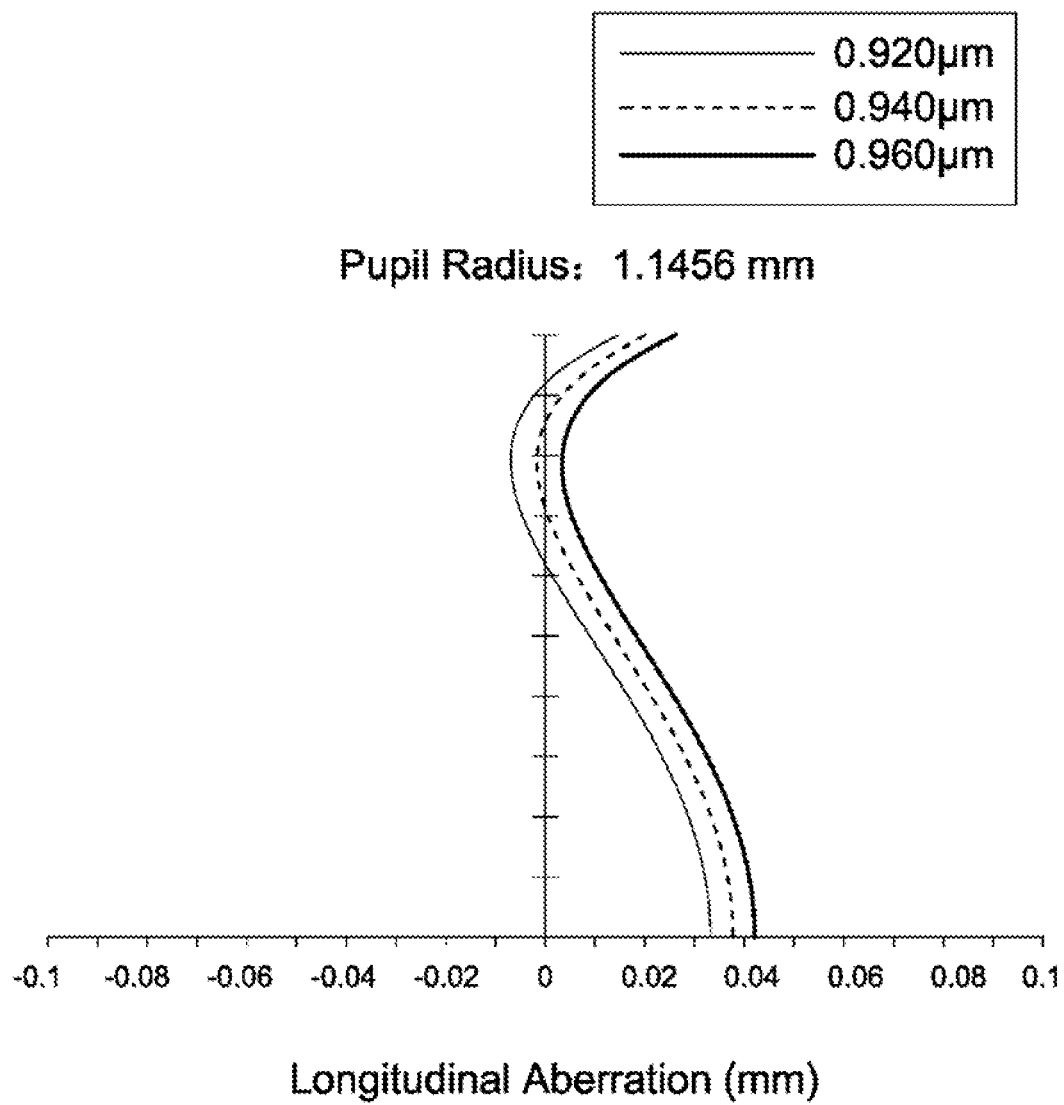
FIG. 4A is a longitudinal aberration diagram of the lens assembly in accordance with the second embodiment of the invention.
Figure 4B:
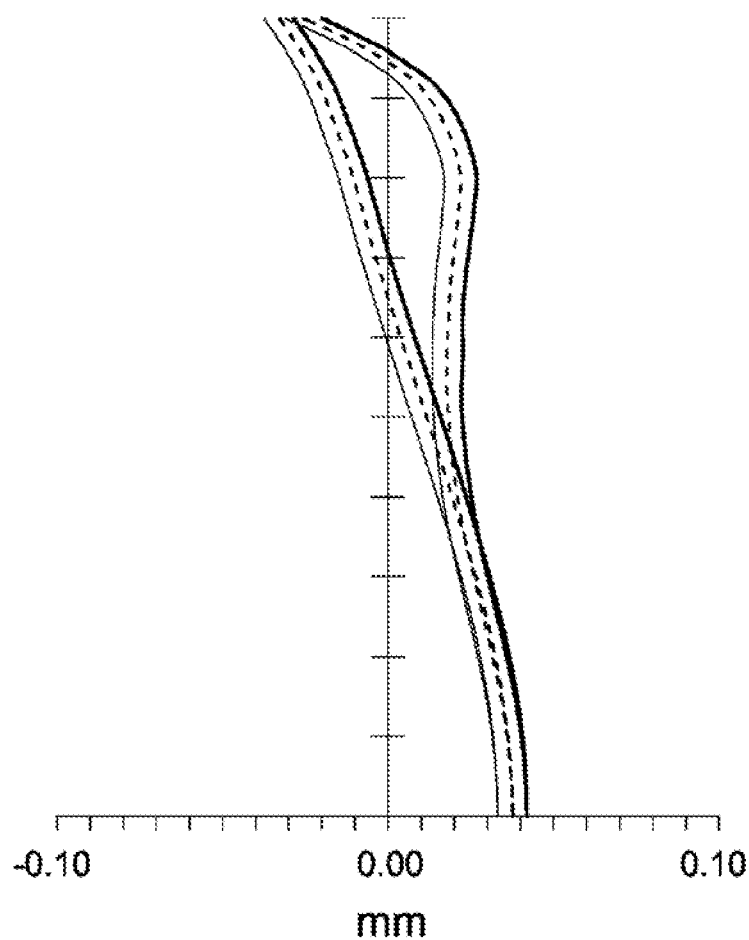
FIG. 4B is a field curvature diagram of the lens assembly in accordance with the second embodiment of the invention.
Figure 4C:
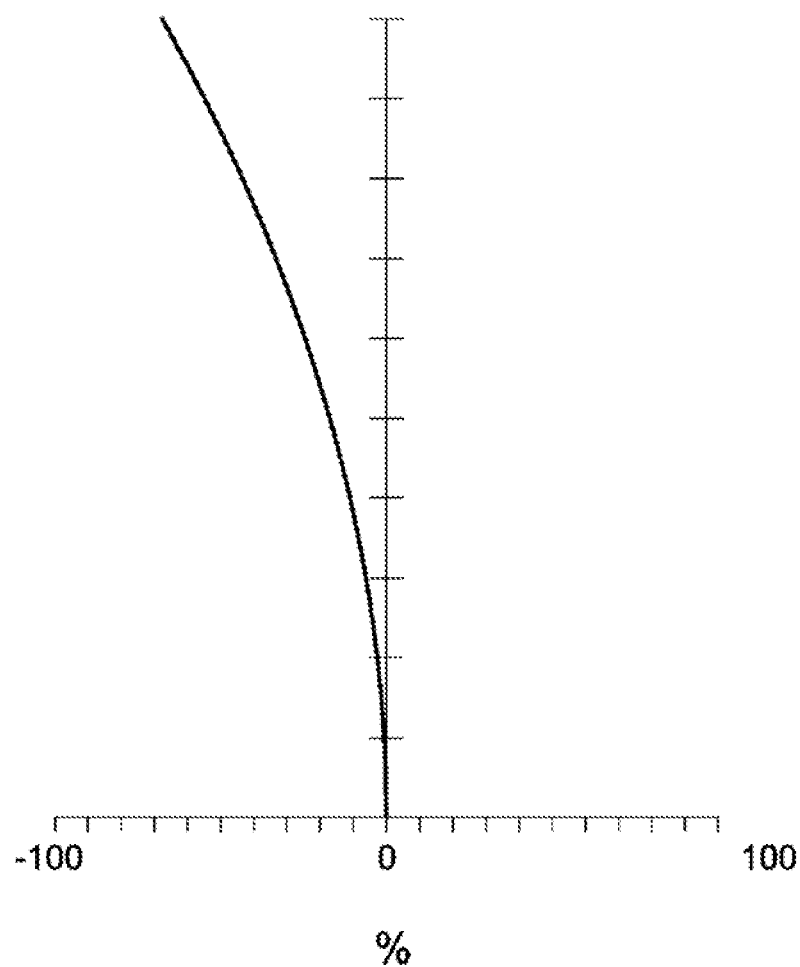
FIG. 4C is a distortion diagram of the lens assembly in accordance with the second embodiment of the invention.

Besides, by the above arrangements of the lenses and the stop ST2, the lens assembly 2 of the second embodiment can meet the requirements of optical performance. It can be seen from FIG. 4A that the longitudinal aberration in the lens assembly 2 of the second embodiment ranges from −0.01 mm to 0.05 mm. It can be seen from FIG. 4B that the field curvature of tangential direction and sagittal direction in the lens assembly 2 of the second embodiment ranges from −0.04 mm to 0.05 mm. It can be seen from FIG. 4C that the distortion in the lens assembly 2 of the second embodiment ranges from −70% to 0%.

It is obvious that the longitudinal aberration, the field curvature, and the distortion of the lens assembly 2 of the second embodiment can be corrected effectively. The resolution and the depth of focus of the lens assembly 2 of the second embodiment can also meet the requirements. Therefore, the lens assembly 2 of the second embodiment is capable of good optical performance.

Referring to FIG. 5, the lens assembly 3 includes a first lens L31, a second lens L32, a third lens L33, a fourth lens L34, a stop ST3, a fifth lens L35, a sixth lens L36, a seventh lens L37, an eighth lens L38, an optical filter OF3, and a cover glass CG3, all of which are arranged in order from an object side to an image side along an optical axis OA3. In operation, an image of light rays from the object side is formed at an image plane IMA3. According to the foregoing paragraphs, wherein:

The second lens L32 is a meniscus lens, the objective surface S33 thereof is concave and the image surface S34 thereof is convex. The third lens L33 is a meniscus lens, the objective surface S35 thereof is concave, and the image surface S36 thereof is convex. The fourth lens L34 is a biconvex lens, and the objective surface S37 thereof is convex. The fifth lens L25 is a biconvex lens, and the objective surface S310 thereof is convex. The sixth lens L36 is a meniscus lens, the objective surface S312 thereof is convex, and the image surface S313 thereof is concave. The seventh lens L37 is a meniscus lens, and the image surface S315 thereof is concave. The eighth lens L38 is a biconcave lens, and the image surface S317 thereof is concave.

Both the objective surface S318 and the image surface S319 of the optical filter OF3 are flat surfaces.

Both an objective surface S320 and an image surface S321 of the cover glass CG3 are flat surfaces;

With the above design of the lenses and the stop ST3 and at least any one of the conditions (1)-(4) satisfied, the lens assembly 3 can have an effective shorter total lens length, an effective increased resolution, an effective resisted environmental temperature change, and is capable of an effective corrected aberration.

Table 5 shows the optical specification of the lens assembly 3 in FIG. 5.

TABLE 5

Effective Focal Length = 2.884 mm F-number = 1.33
Total Lens Length = 21.199 mm Field Of View = 146 Degrees

| Surface Number | Radius of Curvature (mm) | Thickness (mm) | Nd | Vd | Effective Focal Length (mm) | Remark |
|---|---|---|---|---|---|---|
| S31 | 17.775 | 0.400 | 1.7 | 52.4 | −5.525 | The First Lens L31 |
| S32 | 3.110 | 2.889 | | | | |
| S33 | −4.350 | 0.400 | 1.59 | 61.3 | −29.726 | The Second Lens L32 |
| S34 | −6.016 | 0.063 | | | | |
| S35 | −21.630 | 3.702 | 2.05 | 26.9 | 11.363 | The Third Lens L33 |
| S36 | −8.180 | 0.380 | | | | |
| S37 | 40.286 | 0.817 | 1.88 | 41 | 16.69 | The Fourth Lens L34 |
| S38 | −22.117 | 0.306 | | | | |
| S39 | ∞ | 4.763 | | | | Stop ST3 |
| S310 | 29.615 | 1.323 | 1.62 | 57.1 | 20.042 | The Fifth Lens L35 |
| S311 | −20.585 | 0.095 | | | | |

TABLE 5-continued

Effective Focal Length = 2.884 mm F-number = 1.33
Total Lens Length = 21.199 mm Field Of View = 146 Degrees

| Surface Number | Radius of Curvature (mm) | Thickness (mm) | Nd | Vd | Effective Focal Length (mm) | Remark |
|---|---|---|---|---|---|---|
| S312 | 11.520 | 1.305 | 1.88 | 41 | 16.697 | The sixth Lens L36 |
| S313 | 55.028 | 0.091 | | | | |
| S314 | 6.453 | 1.761 | 1.62 | 56.9 | 13.995 | The seventh Lens L37 |
| S315 | 23.463 | 0.840 | | | | |
| S316 | −31.573 | 0.455 | 1.99 | 16.5 | −16.235 | The eighth Lens L38 |
| S317 | 29.475 | 0.322 | | | | |
| S318 | ∞ | 0.210 | 1.52 | 64.2 | | optical filter OF3 |
| S319 | ∞ | 0.500 | | | | |
| S320 | ∞ | 0.500 | 1.52 | 64.2 | | cover glass CG3 |
| S321 | ∞ | 0.076 | | | | |

Table 6 shows the parameters and condition values for conditions (1)-(4) in accordance with the third embodiment of the invention. It can be seen from Table 6 that the lens assembly 3 of the third embodiment satisfies the conditions (1)-(4).

TABLE 6

| | | | | | |
|---|---|---|---|---|---|
| $GAP_{5678}$ | 1.027 mm | $T_{5678}$ | 4.844 mm | $D_1$ | 8.500 mm |
| $D_7$ | 8.267 mm | | | | |
| $GAP_{5678}/T_{5678}$ | 0.212 | $f_1/f$ | −1.916 | $D_1/D_7$ | 1.028 |
| $GAP_{5678}/TTL$ | 0.048 | | | | |

Figure 6A:
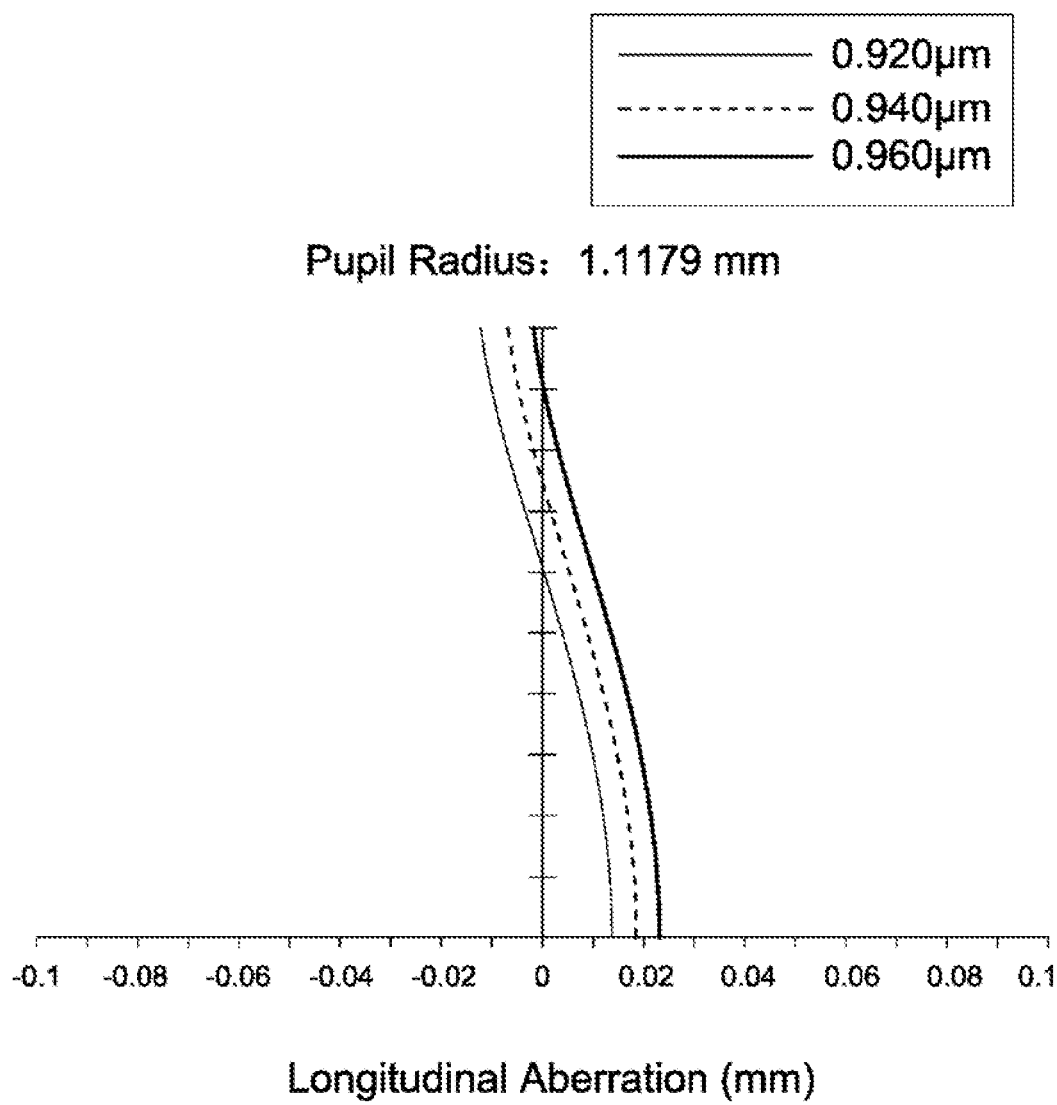
FIG. 6A is a longitudinal aberration diagram of the lens assembly in accordance with the third embodiment of the invention.
Figure 6B:
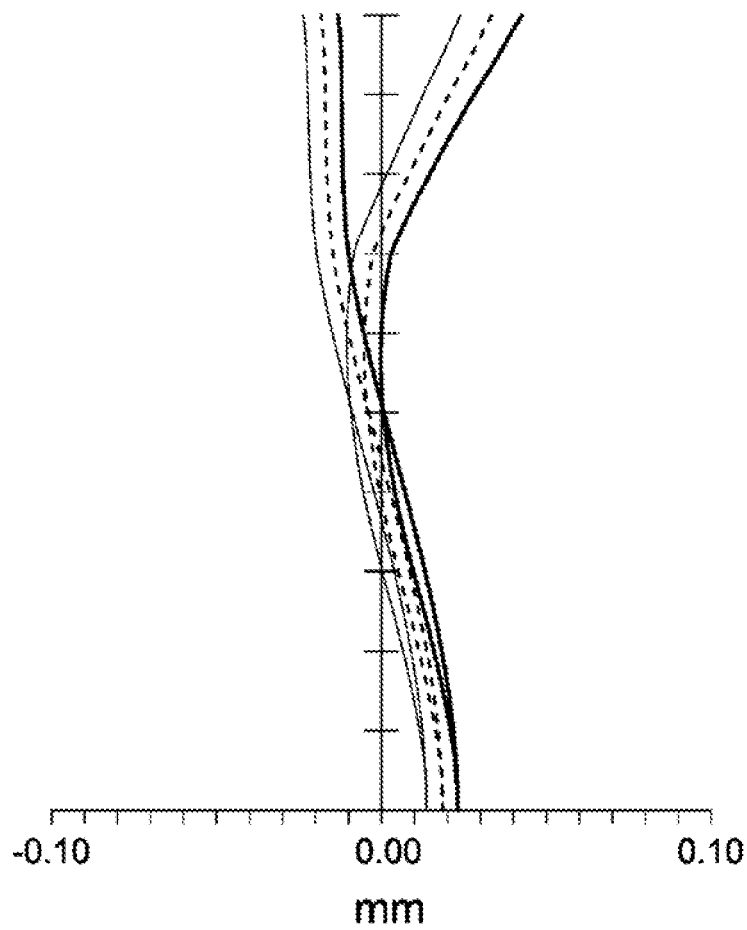
FIG. 6B is a field curvature diagram of the lens assembly in accordance with the third embodiment of the invention.
Figure 6C:
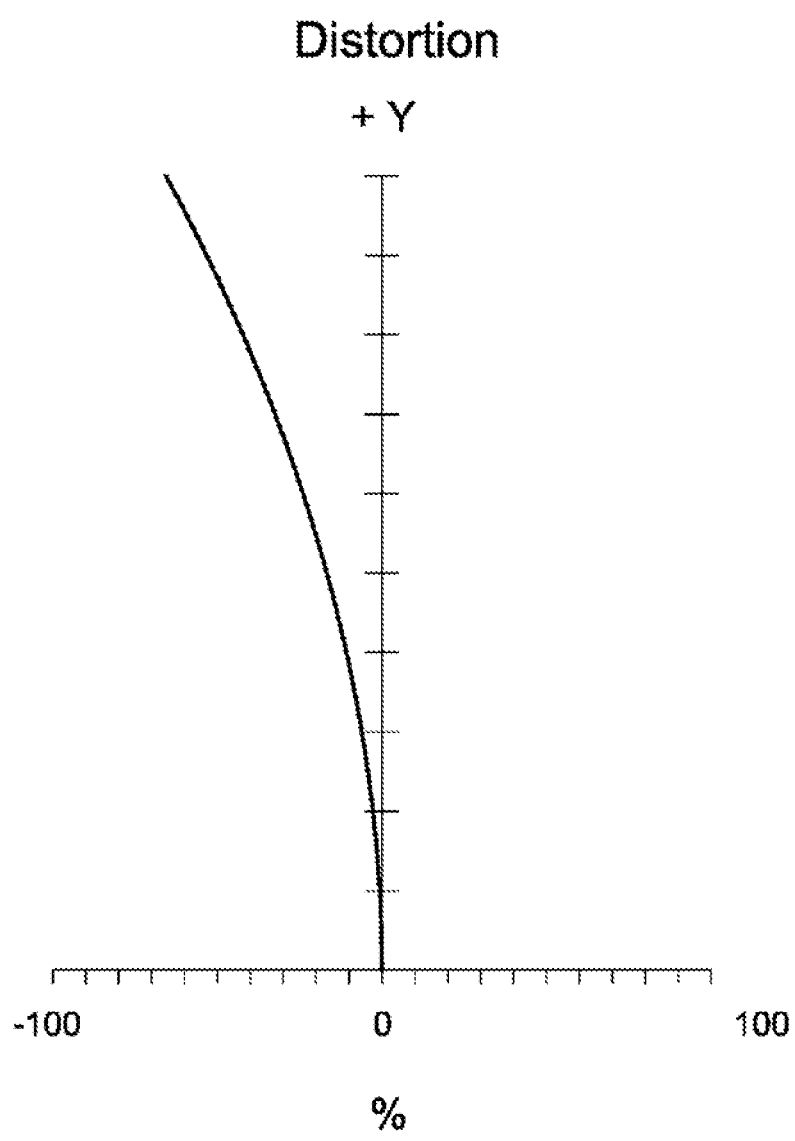
FIG. 6C is a distortion diagram of the lens assembly in accordance with the third embodiment of the invention.

Besides, by the above arrangements of the lenses and the stop ST3, the lens assembly 3 of the third embodiment can meet the requirements of optical performance. It can be seen from FIG. 6A that the longitudinal aberration in the lens assembly 3 of the third embodiment ranges from −0.02 mm to 0.03 mm. It can be seen from FIG. 6B that the field curvature of tangential direction and sagittal direction in the lens assembly 3 of the third embodiment ranges from −0.04 mm to 0.05 mm. It can be seen from FIG. 6C that the distortion in the lens assembly 3 of the third embodiment ranges from −70% to 0%.

It is obvious that the longitudinal aberration, the field curvature, and the distortion of the lens assembly 3 of the third embodiment can be corrected effectively. Therefore, the lens assembly 3 of the third embodiment is capable of good optical performance.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A lens assembly, comprising:
    a first lens, a second lens, a third lens, a fourth lens, a sixth lens, a seventh lens and an eighth lens; wherein
    the first lens is a meniscus lens with negative refractive power and comprises a convex surface facing an object side and a concave surface facing an image side;
    the second lens is with negative refractive power;
    the third lens is with refractive power;
    the fourth lens is with positive refractive power;
    the fifth lens with positive refractive power comprises a convex surface facing the image side;
    the sixth lens is with positive refractive power;
    the seventh lens is with positive refractive power;
    the eighth lens with negative refractive power comprises a concave surface facing the object side; and
    the first lens, the second lens, the third lens, the fourth lens, the sixth lens, the seventh lens and the eighth lens are arranged sequentially from the object side to the image side along an optical axis;
    wherein the lens assembly satisfies at least one of the following conditions:

$0.05 < GAP_{5678}/T_{5678} < 0.25$, $-2.0 < f_1/f < -1.7$, $1.0 < D_1/D_7 < 1.1$, $0.02 < GAP_{5678}/TTL < 0.06$, wherein $GAP_{5678}$ is a sum of an air interval from the fifth lens to the eighth lens along the optical axis, $T_{5678}$ is a sum of a lens thickness of the fifth lens to the eighth lens along the optical axis, $f_1$ is an effective focal length of the first lens, f is an effective focal length of the lens assembly, $D_1$ is a larger one of optical effective diameter of the objective surface and the image surface of the first lens, $D_7$ is a larger one of optical effective diameter of the objective surface and the image surface of the seventh lens, and TTL is an interval from the objective surface of the first lens to an image plane along the optical axis.

2. The lens assembly as claimed in claim 1, the lens assembly further comprising a stop disposed between the fourth lens and the fifth lens, wherein the second lens is a meniscus lens, the third lens is with positive refractive power, the fourth lens comprises a convex surface facing the image side, the seventh lens comprises a convex surface facing the object side.

3. The lens assembly as claimed in claim 2, wherein the second lens comprises a convex surface facing the object side and a concave surface facing the image side, the third lens comprises a convex surface facing the object side and another convex surface facing the image side, the fourth lens is a meniscus lens and further comprises a concave surface facing the object side, the fifth lens is a meniscus lens and further comprises a concave surface facing the object side, the sixth lens is a meniscus lens and comprises a concave surface facing the object side and a convex surface facing the image side, the seventh lens is a biconvex lens and further comprises another convex surface facing the image side, and the eighth lens is a meniscus lens and further comprises a convex surface facing the image side.

4. The lens assembly as claimed in claim 2, wherein the second lens comprises a convex surface facing the object side and a concave surface facing the image side, the third lens is a meniscus lens comprises a convex surface facing the object side and a concave surface facing the image side, the fourth lens is a meniscus lens and further comprises a concave surface facing the object side, the fifth lens is a meniscus lens and further comprises a concave surface facing the object side, the sixth lens is a biconvex lens and comprises a convex surface facing the object side and another convex surface facing the image side, the seventh lens is a biconvex lens and further comprises another convex surface facing the image side, and the eighth lens is a biconcave lens and comprises another concave surface facing the image side.

5. The lens assembly as claimed in claim 2, wherein the second lens comprises a concave surface facing the object side and a convex surface facing the image side, the third lens is a meniscus lens and comprises a concave surface facing the object side and a convex surface facing the image side, the fourth lens is a biconvex lens and further comprises another convex surface facing the object side, the fifth lens is a biconvex lens and further comprises another convex surface facing the object side, the sixth lens is a meniscus lens and comprises a convex surface facing the object side and a concave surface facing the image side, the seventh lens is a meniscus lens and further comprises a concave surface facing the image side, and the eighth lens is a biconcave lens and comprises another concave surface facing the image side.

6. A lens assembly, comprising:
a first lens, a second lens, a third lens, a fourth lens, a sixth lens, a seventh lens and an eighth lens; wherein
the first lens is a meniscus lens with negative refractive power and comprises a convex surface facing an object side and a concave surface facing an image side;
the second lens is with negative refractive power;
the third lens is with refractive power;
the fourth lens is a meniscus lens with positive refractive power and comprises a concave surface facing the object side and a convex surface facing the image side;
the fifth lens is a meniscus lens with positive refractive power and comprises a concave surface facing the object side and a convex surface facing the image side;
the sixth lens is with refractive power;
the seventh lens is with positive refractive power;
the eighth lens is with negative refractive power and comprises a concave surface facing the image side; and
the first lens, the second lens, the third lens, the fourth lens, the sixth lens, the seventh lens and the eighth lens are arranged sequentially from the object side to the image side along an optical axis.

7. The lens assembly as claimed in claim 6, the lens assembly further comprising a stop disposed between the fourth lens and the fifth lens, wherein the sixth lens is with positive refractive power, the eighth lens comprises a concave surface facing the object side.

8. The lens assembly as claimed in claim 7, wherein the second lens is a meniscus lens and comprises a convex surface facing the object side and a concave surface facing the image side, the third lens is with positive refractive power, the sixth lens comprises a convex surface facing the image side, and the seventh lens is a biconvex lens and comprises a convex surface facing the object side and another convex surface facing the image side.

9. The lens assembly as claimed in claim 7, wherein the second lens is a meniscus lens and comprises a convex surface facing the object side and a concave surface facing the image side, the third lens is a meniscus lens with positive refractive power and comprises a convex surface facing the object side and a concave surface facing the image side, the sixth lens is a biconvex lens and comprises a convex surface facing the object side and another convex surface facing the image side, and the seventh lens is a biconvex lens and comprises a convex surface facing the object side and another convex surface facing the image side.

10. The lens assembly as claimed in claim 7, wherein the second lens is a meniscus lens, the third lens is a meniscus lens with positive refractive power one of the objective side and the image side of the fourth lens comprises a convex surface, one of the objective side and the image side of the fifth lens comprises a convex surface, the sixth lens comprises a convex surface facing the object side, and the seventh lens comprises a convex surface facing the object side.

11. The lens assembly as claimed in claim 6, wherein the second lens is a meniscus lens and the third lens is a meniscus lens.

12. The lens assembly as claimed in claim 6, wherein the lens assembly satisfies at least one of the following conditions:

$$0.05<GAP_{5678}/T_{5678}<0.25,$$

$$-2.0<f1/f<-1.7,$$

$$1.0<D1/D7<1.1,$$

$$0.02<GAP_{5678}/TTL<0.06,$$

wherein $GAP_{5678}$ is a sum of an air interval from the fifth lens to the eighth lens along the optical axis, $T_{5678}$ is a sum of a lens thickness of the fifth lens to the eighth lens along the optical axis, f1 is an effective focal length of the first lens, f is an effective focal length of the lens assembly, D1 is a larger one of optical effective diameter of the objective surface and the image surface of the first lens, D7 is a larger one of optical effective diameter of the objective surface and the image surface of the seventh lens, and TTL is an interval from the objective surface of the first lens to an image plane along the optical axis.

13. A lens assembly, comprising:
a first lens, a second lens, a third lens, a fourth lens, a sixth lens, a seventh lens and an eighth lens; wherein
the first lens is a meniscus lens with negative refractive power and comprises a convex surface facing an object side and a concave surface facing an image side;
the second lens is a meniscus lens with negative refractive power and comprises a concave surface facing the object side and a convex surface facing the image side;
the third lens is a meniscus lens with refractive power;
the fourth lens is with positive refractive power;
the fifth lens is with positive refractive power;
the sixth lens is with refractive power;
the seventh lens is with positive refractive power;
the eighth lens with negative refractive power; and
the first lens, the second lens, the third lens, the fourth lens, the sixth lens, the seventh lens and the eighth lens are arranged sequentially from the object side to the image side along an optical axis.

14. The lens assembly as claimed in claim 13, the lens assembly further comprising a stop disposed between the fourth lens and the fifth lens, wherein the fifth lens comprises a convex surface facing the image side, the sixth lens is with positive refractive power, the eighth lens comprises a concave surface facing the object side.

15. The lens assembly as claimed in claim 14, wherein the third lens is with positive refractive power and one of the objective side and the image side of the third lens comprises a convex surface, the fourth lens comprises a convex surface facing the image side, and the seventh lens comprises a convex surface facing the object side.

16. The lens assembly as claimed in claim 14, wherein the third lens is with positive refractive power, the fourth lens comprises a convex surface facing the image side, the sixth lens comprises a convex surface facing the object side the seventh lens comprises a convex surface facing the object side, and the eighth lens is a biconcave lens and further comprises another concave surface facing the image side.

17. The lens assembly as claimed in claim 14, wherein the third lens is with positive refractive power and comprises a concave surface facing the object side and a convex surface facing the image side, the fourth lens is a biconvex lens and comprises a convex surface facing the object side and another convex surface facing the image side, the fifth lens is a biconvex lens and further comprises another convex surface facing the object side, the sixth lens is a meniscus lens and comprises a convex surface facing the object side and a concave surface facing the image side, the seventh lens is a meniscus lens and comprises a convex surface facing the object side and a concave surface facing the image side, and the eighth lens is a biconcave lens and further comprises another concave surface facing the image side.

18. The lens assembly as claimed in claim 13, wherein the lens assembly satisfies at least one of the following conditions:

$0.05 < GAP_{5678}/T_{5678} < 0.25$, $-2.0 < f1/f < -1.7$, $1.0 < D1/D7 < 1.1$, $0.02 < GAP_{5678}/TTL < 0.06$, wherein $GAP_{5678}$ is a sum of an air interval from the fifth lens to the eighth lens along the optical axis, $T_{5678}$ is a sum of a lens thickness of the fifth lens to the eighth lens along the optical axis, f1 is an effective focal length of the first lens, f is an effective focal length of the lens assembly, D1 is a larger one of optical effective diameter of the objective surface and the image surface of the first lens, D7 is a larger one of optical effective diameter of the objective surface and the image surface of the seventh lens, and TTL is an interval from the objective surface of the first lens to an image plane along the optical axis.

* * * * *